No. 616,713. Patented Dec. 27, 1898.
N. LOWE, Sr.
AUTOMATIC WAGON BRAKE.
(Application filed Oct. 14, 1898.)
(No Model.)
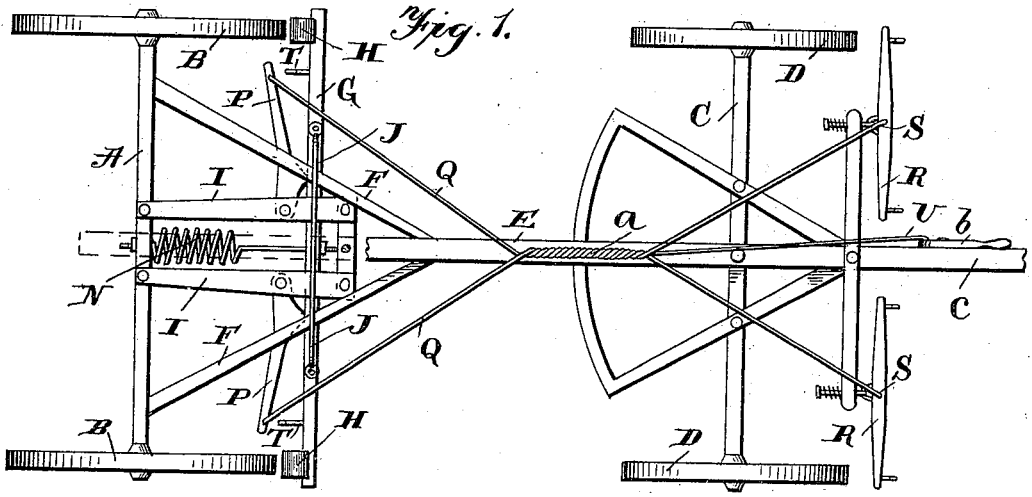
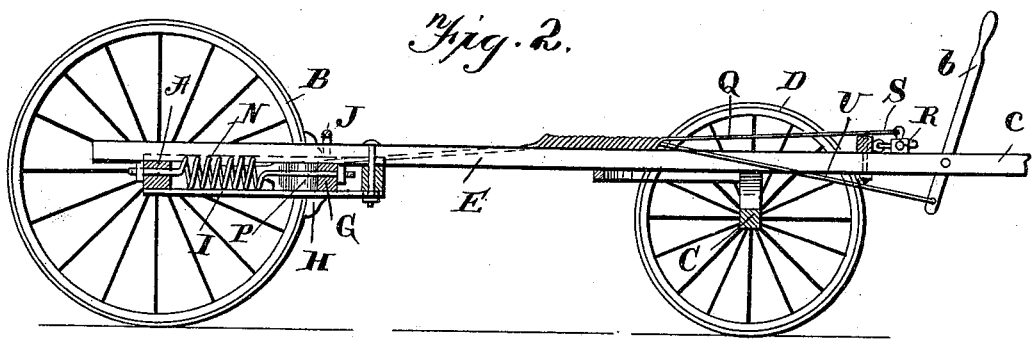
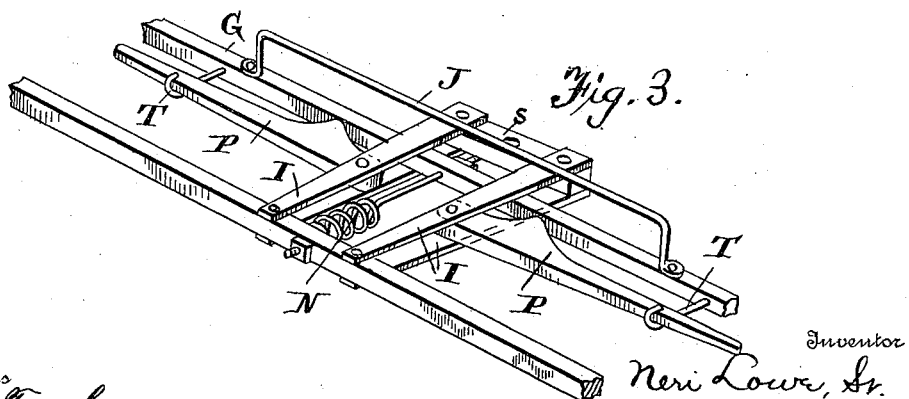
Witnesses
Geo. E. Frech.
Chas. R. Wright
Inventor
Neri Lowe, Sr.
by A. S. Pattison
Attorney

United States Patent Office.

NERI LOWE, SR., OF LEBANON, TENNESSEE.

AUTOMATIC WAGON-BRAKE.

SPECIFICATION forming part of Letters Patent No. 616,713, dated December 27, 1898.

Application filed October 14, 1898. Serial No. 693,523. (No model.)

*To all whom it may concern:*

Be it known that I, NERI LOWE, Sr., a citizen of the United States, residing at Lebanon, in the county of Wilson and State of Tennessee, have invented new and useful Improvements in Automatic Wagon-Brakes, of which the following is a specification.

My invention relates to improvements in automatic wagon-brakes and pertains to a brake adapted to be attached to the running-gear of a wagon.

The object of my invention is to provide a brake so constructed that the draft of the animal will prevent the brake from being applied, but which will be automatically applied when the animal stops or when going downgrade, and also to provide means for holding the braking mechanism out of operation when desired.

In the accompanying drawings, Figure 1 is a top plan view of a wagon running-gear with my invention applied thereto. Fig. 2 is a longitudinal sectional view taken through the center of Fig. 1. Fig. 3 is a detached view of the braking mechanism adapted to be attached to the wagon running-gear.

Referring now to the drawings, A is the rear axle, and B the supporting-wheels therefor.

C is the front axle, D the supporting-wheels therefor, and E the reach connecting the front and rear axles. Connecting the rear axle A and the reach E are the hounds F of the ordinary construction.

My invention pertains to a braking mechanism in which G is a brake-bar extending transversely across the running-gear at a point in front of the rear supporting-wheels B and carries at each end brake-shoes H, adapted to engage the tires of the wheels B.

Brake-lever supports I have their rear ends bolted or otherwise suitably attached to the rear axle A and their front ends extending in front of the brake-bar G and connected with the reach E by bar s. The brake-bar G is situated below the reach and the hounds, and a rod J has its end connected with the said brake-bar G and passes up over the hounds and the reach, thus supporting the brake-bar below the reach. A bolt-spring N passes through the hind axle and connects the brake-bar G, and the spring exerts a normal tension upon the brake-bar, drawing it against the tires of the rear wheels, thus effecting a braking action until the bar is drawn from the wheels in a manner to be presently described.

Brake-levers P have their inner ends pivotally connected to the bars I and project outward and rearward, as clearly illustrated, their inner ends engaging the rear sides of the brake-bar at a point outside of their pivotal points, whereby when the levers are drawn forward they will force the brake-bar forward against the tension of the spring N, thus carrying the brake-bar shoe away from the rear wheels and releasing all friction, thus enabling the wagon to be drawn without any braking action.

Rods or wires Q are attached to the outer ends of the brake-levers and extend forward and inward over the reach E, as illustrated, where they are connected together, preferably by twisting, and then diverge outward again and are connected at their forward ends to the singletree R. The forward ends S of these rods having their rear ends connected, as shown, will prevent an uneven pull upon the brake-bar should one animal pull more than another.

For the purpose of holding the brake out of contact with the rear wheels the brake-bar is provided near each end with a hook T, adapted to be caught over the ends of the brake-levers P when they are drawn forward, thus holding the brake-bar out from operation when desired.

It is sometimes desirable to operate the brake by hand, and this I accomplish through the medium of a forwardly-extending rod or wire U, connected through the twisted portion *a* of the rods or wires Q, and the forward end of this rod or wire U is connected to one end of a lever *b*, which is intermediately pivoted to the tongue *c*, the opposite end of the lever *b* acting as a handle. It will thus be seen that a rearward pull upon the lever *b* will draw the brake-levers G forward and release the brake.

An automatic brake constructed as herein shown and described is simple and effective in its operation and is adapted to be applied to the ordinary wagon without any change in its construction, which is very desirable.

Having thus described my invention, what

I claim, and desire to secure by Letters Patent, is—

1. An automatic brake comprising a brake-bar extending transversely across the running-gear and adapted to have its ends engage the rear wheels, a support therefor, oppositely and outwardly extending levers pivoted at their inner ends and engaging the rear side of the brake-bar, connections connected to the outer ends of the levers and extending forward and connected to the singletree, and a rearwardly-drawing spring connected with the brake-bar, substantially as described.

2. An automatic brake comprising a brake-bar extending transverse the running-gear and having its ends adapted to engage the forward sides of the rear wheels, lever-supports connected with the running-gear, levers intermediately pivoted at their inner ends to these supports adjacent the center of the brake-bar, the said levers engaging the rear sides of the brake-bar at a point outside of their pivotal points, connections connected to the outer ends of the levers and extending forward to the singletree, substantially as described.

3. An automatic brake comprising a brake-bar G extending transverse the running-gear and having its ends adapted to engage the periphery of the rear wheels, lever-supports connected with the running-gear, the levers P pivoted at their inner ends and extending rearwardly and outwardly, the pivoted ends of said levers constructed to engage the rear side of the brake-bar at a point outside of their pivotal points, a connection between the outer ends of these levers and the singletree, and hooks carried by the brake-bar adapted to hold the said levers forward substantially as and for the purpose described.

4. An automatic brake comprising the brake-bars, the levers P pivoted at their inner ends at a point in rear of the brake-bar and constructed to engage the rear side of the brake-bar at a point outside of their pivotal points, connections connected with the outer ends of the levers and extending inward and connected at the center of the running-gear and their forward ends diverging and connected with the singletree, substantially as and for the purpose described.

5. An automatic brake comprising a brake-bar, the levers P adapted to engage the rear sides thereof, the connections Q between the outer ends of the said levers and the singletree, the connection U connected at its inner end with the connections Q, and a lever $b$ pivoted to the tongue and connected to the outer end of the connection U, whereby the lever $b$ is adapted to operate the brake-levers P, substantially as described.

6. An automatic brake comprising a brake-bar G, the supports I connected at their rear ends to the rear axle and at their forward ends to the reach, the outwardly and oppositely extending levers P pivoted at their inner ends to the supports I at a point in rear of the brake-bar and constructed to engage the brake-bar at a point outside of their pivotal points, the connections L and K, a spring connecting the rear axle and the connection K, and connections between the outer ends of the brake-levers and the singletree, substantially as shown and described.

In testimony whereof I have hereunto set my hand in the presence of two subscribing witnesses.

NERI LOWE, SR.

Witnesses:
J. B. STILES,
A. A. ADAMS.